(12) United States Patent
Masek et al.

(10) Patent No.: US 11,904,373 B2
(45) Date of Patent: Feb. 20, 2024

(54) MODIFICATION OF A DEEP-DRAWING SHEET BLANK FOR ELECTRIC RESISTANCE HEATING

(71) Applicant: Zapadoceska univerzita v Plzni, Plzen (CZ)

(72) Inventors: Bohuslav Masek, Kaznejov (CZ); Ctibor Stadler, Plzen (CZ); Vjaceslav Georgiev, Plzen (CZ); Radek Holota, Kaznejov (CZ)

(73) Assignee: Zapadoceska univerzita v Plzni, Plzen (CZ)

( * ) Notice: Subject to any disclaimer, the term of this patent is extended or adjusted under 35 U.S.C. 154(b) by 38 days.

(21) Appl. No.: 17/196,155

(22) Filed: Mar. 9, 2021

(65) Prior Publication Data

US 2022/0134406 A1  May 5, 2022

(30) Foreign Application Priority Data

Oct. 30, 2020 (CS) .................................. CZ2020-587

(51) Int. Cl.
*B21D 24/16* (2006.01)
*H05B 3/22* (2006.01)
(Continued)

(52) U.S. Cl.
CPC ........... *B21D 24/16* (2013.01); *B21D 22/201* (2013.01); *B32B 3/00* (2013.01); *B32B 3/02* (2013.01); *B32B 3/26* (2013.01); *B32B 3/266* (2013.01); *B32B 3/30* (2013.01); *B32B 38/04* (2013.01); *C21D 1/40* (2013.01); *C21D 9/46* (2013.01); *C21D 9/48* (2013.01); *H05B 3/0004* (2013.01); *H05B 3/22* (2013.01); *B21D 22/208* (2013.01); *B21D 37/16* (2013.01); *B32B 2038/045* (2013.01); *B32B 2038/047* (2013.01);
(Continued)

(58) Field of Classification Search
CPC ...... B21D 37/16; B21D 24/16; B21D 22/201; C21D 1/40; C21D 9/46; C21D 9/48; C21D 2211/02; B32B 38/04; B32B 3/26; B32B 3/266; B32B 3/00; B32B 3/02; B32B 3/30; B32B 2038/045; B32B 2038/047; Y10T 428/12361; Y10T 428/12368; Y10T 428/12229
See application file for complete search history.

(56) References Cited

U.S. PATENT DOCUMENTS 1,876,519 A * 9/1932 McKinney ............... B60J 10/33
428/122
4,273,836 A * 6/1981 Campbell ............... E04C 2/365
428/116
(Continued)

FOREIGN PATENT DOCUMENTS

CZ  308209  2/2020

*Primary Examiner* — Michael E. La Villa
(74) *Attorney, Agent, or Firm* — Brett A. Schenck

(57) ABSTRACT

The present invention generally relates to the modification of a deep-drawing sheet blank (P) for electric resistance heating. Generally, the modified sheet blank comprises slits (Z) being made in the edges of the blank (P) transversely to the electric current flow and oriented towards the perimeter of the forming zone (T). The distances between the ends of the slits (Z) and the forming zone (T) perimeter may be equal. The ends of the slits (Z) oriented towards the forming zone perimeter (T) may also be rounded.

12 Claims, 4 Drawing Sheets

(51) Int. Cl.
  *B32B 3/26* (2006.01)
  *H05B 3/00* (2006.01)
  *B21D 22/20* (2006.01)
  *C21D 1/40* (2006.01)
  *C21D 9/46* (2006.01)
  *C21D 9/48* (2006.01)
  *B32B 3/02* (2006.01)
  *B32B 3/30* (2006.01)
  *B32B 3/00* (2006.01)
  *B32B 38/04* (2006.01)
  *B21D 37/16* (2006.01)

(52) U.S. Cl.
  CPC ... *C21D 2221/02* (2013.01); *Y10T 428/12229* (2015.01); *Y10T 428/12361* (2015.01); *Y10T 428/12368* (2015.01)

(56) References Cited

U.S. PATENT DOCUMENTS

| | | | |
|---|---|---|---|
| 6,553,869 B1 * | 4/2003 | MacKelvie | B23P 15/44 76/112 |
| 2014/0000117 A1 * | 1/2014 | Novak | B23D 65/04 30/353 |
| 2021/0040574 A1 | 2/2021 | Masek et al. | |

* cited by examiner

MODIFICATION OF A DEEP-DRAWING SHEET BLANK FOR ELECTRIC RESISTANCE HEATING

RELATED APPLICATIONS

This application claims the priority benefit of Czech Patent Application No. PV 2020-587 entitled "Modification of a deep-drawing sheet blank for electric resistance heating," filed Oct. 30, 2020, the entire disclosure of which is incorporated herein by reference.

TECHNICAL FIELD

This invention generally relates to the modification of a deep-drawing sheet blank for electric resistance heating.

BACKGROUND ART

Prior to hot steel-sheet deep-drawing operations or hot deep-drawing operations followed by quenching in the die (press-hardening), the steel blank must be brought to an appropriate forming temperature, which is typically above the final critical temperature at which free ferrite is completely transformed into austenite ("$Ac_3$"), where the steel's structure consists of a single phase, austenite. Procedures of this kind are outlined, for instance, in Czech Patent No. CZ308209, which describes a method of manufacturing steel sheet blanks with a locally modified structure in locations intended for welds. In this condition, where the steel structure consists of a single phase, austenite, the steel has favourable ductile properties which are necessary for creating the desired shape and which allow the drawn shell to be quenched immediately after drawing by rapid cooling in the die. In ordinary configurations, heating is carried out in continuous furnaces or in furnaces with multiple low-height chambers, preferably arranged in several horizontal tiers. After the blank is placed in a furnace, the blank is heated to the required temperature over a designated time period, which depends on the material and the prescribed temperature. The heating time for an ordinary sheet 1.5 mm in thickness is approximately 5 minutes. The blank is then removed from the furnace and transferred to a forming die where it is shaped into the required drawn shell. Disadvantages to this procedure include the relatively long heating times and the low efficiency of the conversion of electrical energy into the heat input in the blank.

A steel sheet blank can also be austenitized using electric resistance heating, where the blank is held between jaws with electric current passing through them. Conduction losses cause the blank to heat up to the temperature required for the process. The main drawback of this procedure is that the temperature field in the sheet blanks is inhomogeneous. This inhomogeneity is due to non-uniform current density across the blank, which results in some locations becoming overheated whereas others fail to be brought to the required temperature. Typically, the current density is highest in the edges and in longitudinal portions of the blank's contour, which are the preferred paths for electric current supplied from the jaws. It is due to this occurrence that the blank is heated non-uniformly. The above drawbacks are eliminated or at least minimized by the present invention, which relates to modification of a deep-drawing sheet blank for electric resistance heating.

SUMMARY

One or more embodiments of the present invention generally concern the modification of a deep-drawing sheet blank (P) for electric resistance heating. The modified sheet blank comprises slits (Z) made in edges of the sheet blank (P) that are transversely positioned to the electric current flow and are oriented towards the perimeter of the forming zone (T).

DISCLOSURE OF INVENTION

The present invention generally relates to the modification of a deep-drawing sheet blank for electric resistance heating, which comprises forming slits in the edges of the blank transversely to the electric current flow, the slits being oriented towards the forming zone. As used herein, a "forming zone" refers to the area of the semi-finished product where plastic deformation (i.e. the change of the shape) occurs. In those locations of the sheet blank where overheating occurs, slits may be made in and perpendicularly to the edge, which modify the current density field by substantially reducing the current intensity between the slits. Thus, the slits may become cooling fins, which conduct excess heat away from potentially-overheated locations. Furthermore, the slits do not cause hardening of the flange and do not preclude the deep drawing process. Depending on the shape of the deep-drawn shell and local deformation, the geometry of the slits can be adjusted for the process to ensure they do not impede drawing of the blank into the die. For example, as shown in FIGS. 5 and 6, the slits may have varying geometries, such as branched and rounded ends as shown in FIG. 5 or widened and rounded ends as shown in FIG. 6.

Figure 1:
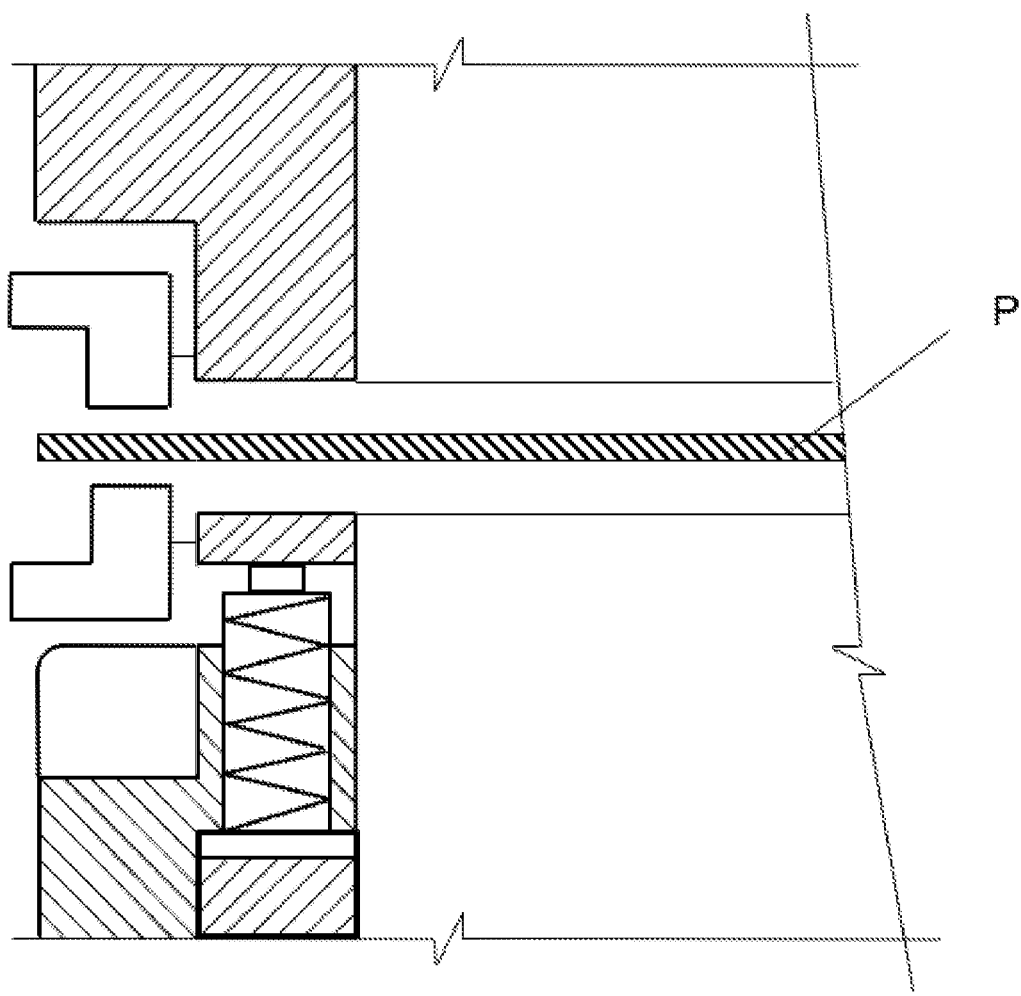
FIG. 1 is a schematic representation of equipment for modifying a deep-drawing sheet blank for electric resistance heating.
Figure 2:
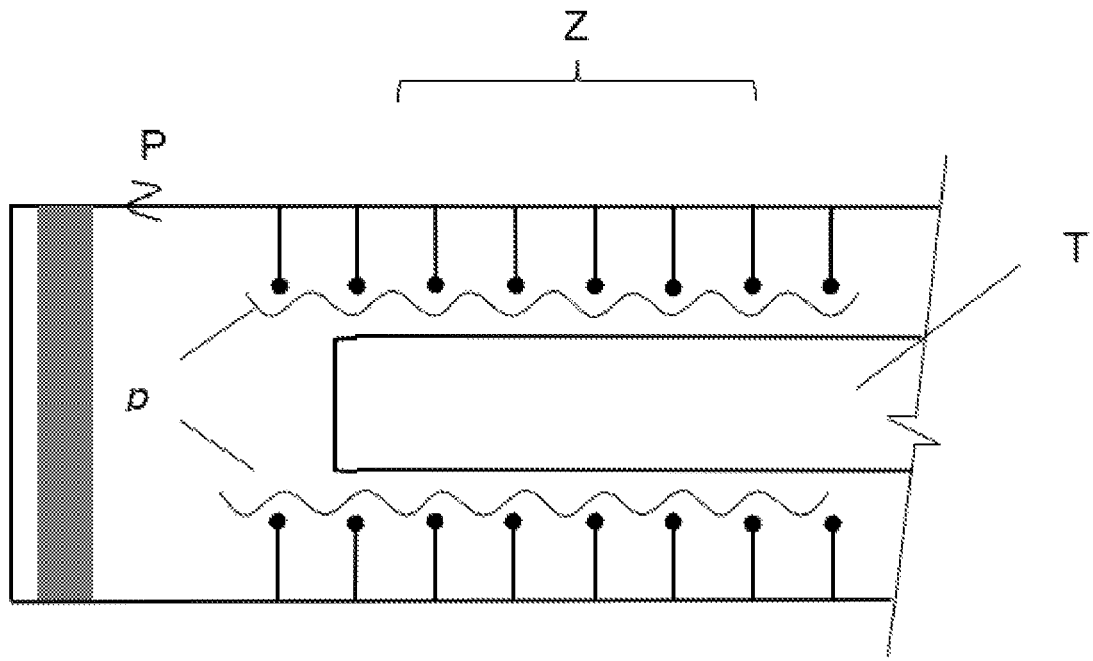
FIG. 2 shows an exemplary embodiment of a blank where current density around the slits is indicated.
Figure 3:
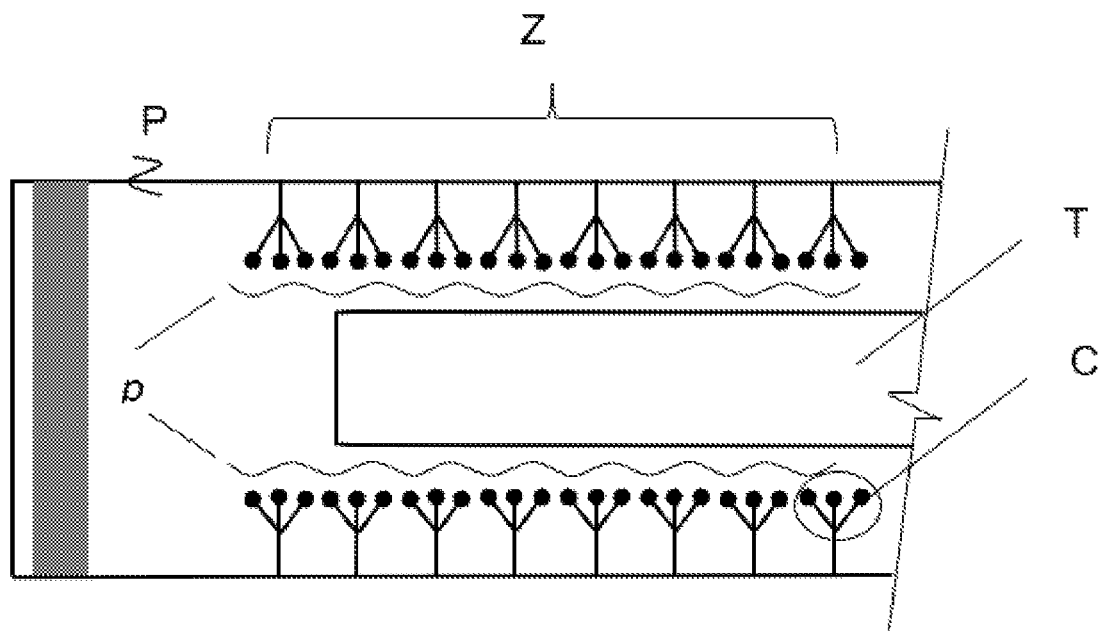
FIG. 3 presents an exemplary embodiment where current density around branched slits is indicated.
Figure 4:
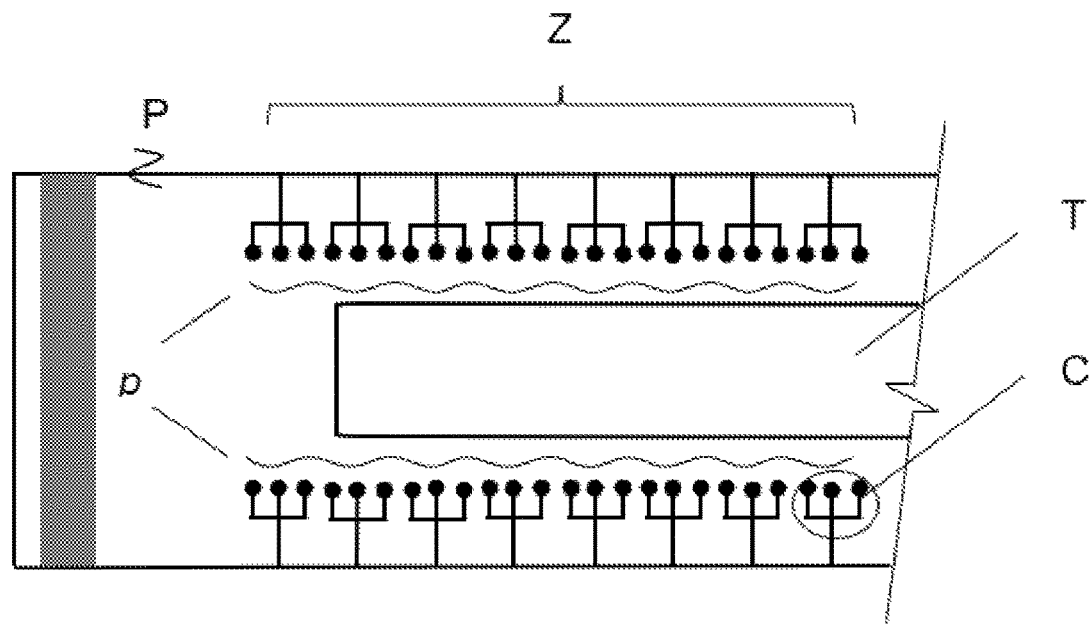
FIG. 4 presents an exemplary embodiment where current density around branched slits is indicated.

Another benefit of the modified sheet blanks comprising the specialized slits is that current density increases in the vicinity of the ends of the slits, thereby causing more heat to be generated in these locations, as shown in FIGS. 2-4. Thus, these locations can become local heat sources. Consequently, they can be used to provide local heating in locations where temperature would otherwise be insufficient.

It is advantageous when the distances between the ends of the slits and the perimeter of the forming zone are equal or when the ends of the slits oriented towards the perimeter of the forming zone are rounded. These adjustments lead to a more uniform current density. The current density may be measured indirectly by a thermal imager because the material is heated due to the electrical resistance of the material. In the case of a uniform current density, there should also be a uniform field of the sensed temperature.

Figure 5:
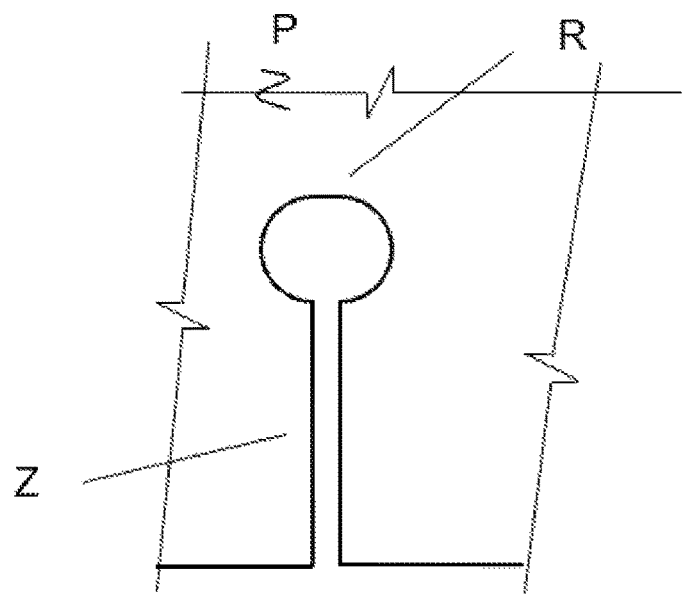
FIG. 5 shows a detail of a slit with branched and rounded ends.
Figure 6:
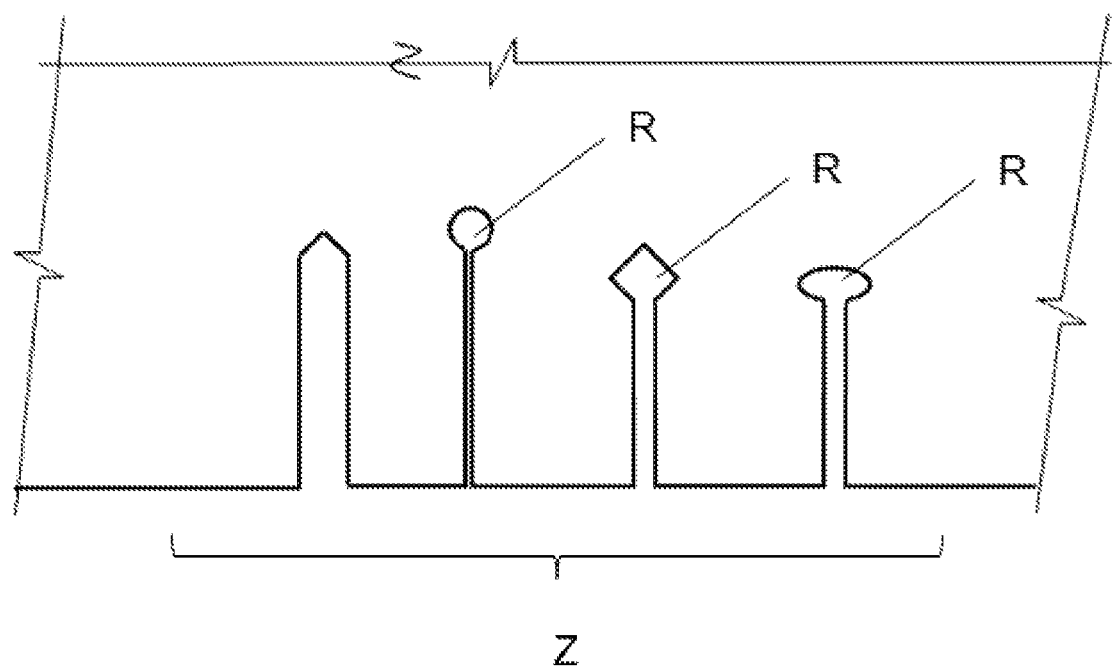
FIG. 6 shows alternative configurations of the slits, including slits with widened and rounded ends.

It is advantageous when the ends of the slits oriented towards the perimeter of the forming zone are branched or widened, as shown in FIGS. 5 and 6, in order to reduce the length of the cut and to control the intensity of heat flow or cooling in the fins.

The depth of the slits and their spacing can be used to control both heating and cooling intensities, particularly in the regions along the blank's edges. Both dimensions can be used to control the point source intensity as well as cooling intensity in the fins. As a result, the temperature field in the blank becomes more uniform and, in addition, efficiency of the direct conversion of electrical energy into thermal energy is better than in the furnace heating process. At the same time, the heating time is reduced.

More particularly, the slits and their spacing allows one to influence the homogeneity of the temperature field and, depending on the requirements of the deep-drawing technology, to also adjust the formability of the semi-finished product so as to best suit the conditions of hot deformation or hot forming. Currently, it is possible to achieve uniform temperatures in the region of the shaped blank. However, these slits can also be used for targeted modification of the temperature field.

In various embodiments, the slits are primarily usable in the edge areas of the semi-finished product and may be part of the edge rim, which typically represents the technological waste. In certain embodiments, the slits may also extend into the area of the semi-finished product.

BEST MODES FOR CARRYING OUT THE INVENTION

Example 1

A sheet blank $\underline{P}$ with dimensions of 350×250 mm and 1.2 mm in thickness, which has been laser-cut from a 22 MnB steel sheet, was positioned horizontally and clamped at its shorter side in jaws of electric resistance heating equipment. Along a length of 300 mm on the longer edge of the blank, slits $\underline{Z}$ with lengths of 10 mm spaced at 12 mm were created, which were oriented towards the perimeter of the forming zone $\underline{T}$. Slits $\underline{Z}$ had a width which corresponded to the laser kerf and the ends of the slits were rounded to form a circular shape, as shown in FIG. 5. Subsequently, electric current was applied to the jaws holding the blank and the electric current passed through the blank. The electric current passing through the blank raised the temperature of the blank gradually until a uniform temperature field at the required temperature of 940° C. was produced. Current density $\underline{p}$ was measured indirectly using a thermal imager and was observed to be uniform along the slits $\underline{Z}$.

In a preferred embodiment, the intensity of electric current may be varied repeatedly in order to either make the temperature field more uniform through thermal conduction or to heat up the material by the point heat sources at the ends of the slits, which are illustrated in FIG. 2 and illustrated in greater detail in FIG. 5 for this embodiment. Once the required temperature and the required uniformity of temperature field are attained, hot deep drawing to the desired shape can be performed in the tool.

Example 2

A sheet blank $\underline{P}$ with dimensions of 450×250 mm and 1.4 mm in thickness, which has been laser-cut from 22 MnB steel sheet, was positioned horizontally and clamped at its shorter side in jaws of electric resistance heating equipment. Along a length of 400 mm on the longer edge of the blank, slits $\underline{Z}$ with lengths of 20 mm spaced at 15 mm were created, which were oriented towards the perimeter of the forming zone $\underline{T}$. Slits $\underline{Z}$ had a width, which corresponded to the laser kerf and were branched $\underline{C}$ at their ends and rounded as shown in FIG. 4. Subsequently, electric current was applied to the jaws holding the blank and the electric current passed through the blank. Electric current passing through the blank raised the temperature of the blank gradually until a uniform temperature field at the required temperature of 940° C. was produced. Current density $\underline{p}$ is uniform along the slits $\underline{Z}$.

INDUSTRIAL APPLICABILITY

The invention can find broad use in the manufacture of hot deep-drawn shells, particularly for structural parts of vehicle bodies and other complex-shaped drawn parts from high-strength steels.

The invention claimed is:

1. A modified deep-drawing sheet blank for electric resistance heating comprising a first edge, a second edge, and a forming zone having a perimeter,
    wherein the first edge is positioned opposite the second edge,
    wherein the forming zone is an area where deformation occurs,
    wherein a plurality of slits are formed in the first edge and the second edge of the modified sheet blank,
    wherein the slits are transversely positioned to an electric current flow and the slits are extended towards the perimeter of the forming zone,
    wherein each of the slits comprise a slit end, wherein the slit ends are extended towards the perimeter of the forming zone and are branched.

2. The modified sheet blank according to claim 1, wherein each of the slits comprise a slit end, wherein all of the slit ends are separated from the perimeter of the forming zone by an equal distance.

3. The modified sheet blank according to claim 1, wherein the slits of the first edge are positioned perpendicular to the first edge.

4. The modified sheet blank according to claim 3, wherein the slits of the second edge are positioned perpendicular to the second edge nature.

5. The modified sheet blank according to claim 1, wherein each of the slits comprise a slit end, wherein all of the slit ends are separated from the perimeter of the forming zone by an equal distance, wherein the slits of the first edge are positioned perpendicular to the first edge.

6. The modified sheet blank according to claim 5, wherein the slits of the second edge are positioned perpendicular to the second edge.

7. A modified deep-drawing sheet blank for electric resistance heating comprising a first edge, a second edge, and a forming zone having a perimeter,
    wherein the first edge is positioned opposite the second edge,
    wherein the forming zone is an area where deformation occurs,
    wherein a plurality of slits are formed in the first edge and the second edge of the modified sheet blank,
    wherein the slits are transversely positioned to an electric current flow and the slits are extended towards the perimeter of the forming zone,
    wherein each of the slits comprise a slit end, wherein the slit ends are extended towards the perimeter of the forming zone and are branched and rounded.

8. The modified sheet blank according to claim 7, wherein each of the slits comprise a slit end, wherein all of the slit ends are separated from the perimeter of the forming zone by an equal distance.

9. The modified sheet blank according to claim 7, wherein the slits of the first edge are positioned perpendicular to the first edge.

10. The modified sheet blank according to claim 9, wherein the slits of the second edge are positioned perpendicular to the second edge.

11. The modified sheet blank according to claim 7, wherein each of the slits comprise a slit end, wherein all of the slit ends are separated from the perimeter of the forming zone by an equal distance, wherein the slits of the first edge are positioned perpendicular to the first edge.

12. The modified sheet blank according to claim 11, wherein the slits of the second edge are positioned perpendicular to the second edge.

* * * * *